United States Patent [19]

Takegami et al.

[11] Patent Number: 4,526,878

[45] Date of Patent: Jul. 2, 1985

[54] METHOD FOR SUPPORTING METAL AND/OR METAL OXIDE ON A CRYSTALLINE ALUMINOSILICATE ZEOLITE CATALYST

[76] Inventors: Yoshinobu Takegami, 5 Shugakuin-Takabe-cho, Sakyo-ku, Kyoto; Tomoyuki Inui, 35-21 Koaza-Shodo, Oaza-Terada, Joyo, both of Japan

[21] Appl. No.: 538,101

[22] Filed: Oct. 3, 1983

Related U.S. Application Data

[63] Continuation-in-part of Ser. No. 350,103, Feb. 18, 1982, abandoned.

[30] Foreign Application Priority Data

Feb. 27, 1981 [JP]  Japan ................................. 56-27732

[51] Int. Cl.³ ..................... B01J 29/06; C01B 33/28
[52] U.S. Cl. ...................................... 502/65; 423/328; 423/329; 502/66; 502/71; 502/77
[58] Field of Search .............................. 423/326–333; 502/60, 63, 64, 66, 71, 77, 65

[56] References Cited

U.S. PATENT DOCUMENTS

| | | | |
|---|---|---|---|
| 3,373,109 | 3/1968 | Frilette et al. | 502/60 |
| 3,769,386 | 10/1973 | Rundell et al. | 423/329 |
| 4,208,305 | 6/1980 | Kouwenhoven et al. | 423/329 |
| 4,400,328 | 8/1983 | Takegami et al. | 260/448 C |

Primary Examiner—Edward J. Meros
Attorney, Agent, or Firm—Oldham, Oldham & Weber Co.

[57] ABSTRACT

The present invention relates to a new method for supporting a metal and/or a metal oxide on a crystalline aluminosilicate zeolite. The resulting products are useful as catalysts and are designated ZKU-5, ZKU-6 and ZKU-7 (Zeolite Kyoto University catalyst). These catalysts display superior catalytic activity and selectivity and have a longer life than catalysts of the prior art.

One method of the invention involves crystallizing a zeolite composition in the presence of both a conditioning agent and a crystal seed supporting the metal and/or metal oxide, the latter providing a nucleus for crystallization. The conditioning agent comprises the lower analogs of a tetraalkyl ammonium cation. The resulting crystal can support one or more metals or metal oxides or a mixture thereof.

The disclosure compares the catalysts of the invention with a known, prior art catalyst, namely ZSM-34.

1 Claim, 2 Drawing Figures

METHOD FOR SUPPORTING METAL AND/OR METAL OXIDE ON A CRYSTALLINE ALUMINOSILICATE ZEOLITE CATALYST

This is a continuation-in-part of U.S. patent application Ser. No. 350,103, filed Feb. 18, 1982, now abandoned.

BACKGROUND OF THE INVENTION

The present invention relates to a new method for supporting metal and/or metal oxide on crystalline aluminosilicate zeolite. The catalysts produced by this method are also new and shall hereinafter be designated ZKU-5, ZKU-6, and ZKU-7.

The above catalysts have superior catalytic activity, selectivity, and catalytic life and are suitable for use in the manufacture of low molecular weight olefins from methanol.

Two such olefins in high demand are ethylene and propylene, which are used as the main starting materials in the petrochemical industry and which are preferred over the use of petroleum naphtha.

Heretofore, crystal aluminosilicate zeolite catalyst have been known. Examples of such may be found in Japanese patent application no. 136,715/80, now Japanese Patent laid open No. 63,135/82 wherein the catalysts are designated ZKU-2, ZKU-3, and ZKU-4. These catalysts are manufactured by adding a tetraloweralkyl ammonium cation and a crystal seed to synthesis reaction mixture. The period of time necessary to produce the crystal is remarkably shortened and the catalysts have superior catalytic activity, selectivity and a longer life.

The crystal seed is used to promote crystalization and catalytic activity and to improve mechanical strength and dimensional stability. Further, it provides a conditioning of the pore structure in the molded catalyst crystal and improves dispersion of the components in the catalytic composition.

Generally, there are three prior art methods available for depositing a metal and/or a metal oxide, viz., (a) ion exchange, (b) impregnation and (c) physical mixing. These are as follows:

(a) The ion exchange method

The ion exchange method is the most conventional of the three. However, it is limited in the type and quantity of metal which can be deposited. Metal oxides cannot be deposited directly using this method. Moreover, the ion exchange rate is difficult to control if more than two metallic ions are to be exchanged, due to their different ion exchange rates.

The ion exchange method also has an adverse effect on the cellular structure and the physical strength of the zeolite crystal.

The impregnation method

The impregnation method is disadvantageous in that, by nonselectively covering the zeolite with the impregnating substance, the activity points and thus the catalystic activity of the zeolite is reduced. The activity is further affected by a reduction in the diffusion of the reaction components in the zeolite due to blockage of the pores.

(c) The physical mixing method

This method involves compounding the metal catalysts while maintaining the catalytic activity of the zeolite itself. Exemplary of mixed catalysts made using this method are ZSM-5 zeolite catalysts recently manufactured by Mobil Company and the Fisher-Tropsch synthesis catalyst, both of which have been used in the manufacture of a synthesis gas product rich in the gasoline fraction using a one step process. In using the physical mixing method, however, there is some concern that the catalyst will exist in an uneven mixing state, since the method involves merely physically combining the components. The composite effect obtained from combining each component of the catalyst is also limited, since the catalytic activity points of the composite catalysts are too far removed from each other when considered from the standpoint of kinetics.

The characteristic features of the present invention are as follows:

(1) The "seed or nucleus crystallization method" of the invention is capable of uniting various sorts of metal oxide with the zeolite crystal without injuring the specific character of the activity or the porosity of the zeolite catalyst. This method overcomes the disadvantages of the impregnation and ion exchange methods.

(2) The method is also capable of uniting optimal catalytic components comprising one or not less than two metals and/or metal oxides at the optimal ratio, thus overcoming a disadvantage of the ion exchange method.

(3) The method is further capable of uniformly and highly dispersing one or not less than two metals and/or metal oxides on the individual zeolite crystal.

The method of the invention involves combining the metal and/or metal oxide directly with the individual zeolite crystal to produce a uniform and highly dispersed state, in contrast to similar catalysts manufactured according to the physical mixing method. As the crystal seed is combined with the metal and/or metal oxide and then intimately adhered to the zeolite crystal, each active metal and/or metal oxide component are in a position nearer to the zeolite crystal compared to a similar catalyst made using the physical mixing method. The composite effect of catalytic activity is thus fully displayed.

As mentioned above, the present invention overcomes the disadvantages of the physical mixing method.

DISCLOSURE OF THE INVENTION

It is an aspect of the present invention to provide a new method of supporting metal and/or metal oxide on a crystalline aluminosilicate zeolite catalyst.

A further aspect of the present invention is to provide new catalysts designated ZKU-5, ZKU-6, and ZKU-7, which are made by the method of the present invention.

Figure 1:
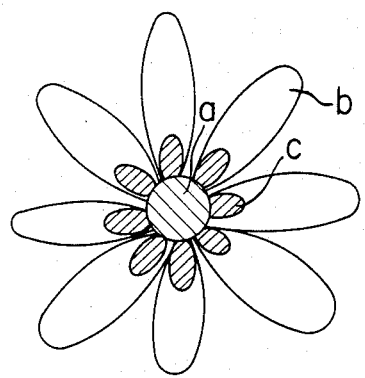
FIG. 1 and FIG. 2 are rough diagrams showing the crystal structure of the catalyst designated ZKU-5, ZKU-6 and ZKU-7 which support metal and/or metal oxide and are manufactured according to the method of the present invention.

In the figures, letter a indicates α-alumina, b indicates zeolite crystal and letter c indicates γ-alumina.

BEST MODE FOR CARRYING OUT THE INVENTION

The method of the present invention comprises adding and mixing a substance which acts as a nucleus for a catalyst to a zeolite synthesis reaction mixture having the composition shown in formula [I]. The substance usable for the nucleus is a crystal seed which, in this invention, supports one or more metals and/or metal oxides. The nucleus materials depositing metal and/or metal oxides is crystallized with the zeolite synthesis reaction mixture in the presence of a conditioning agent thereon at a temperature of between 150 and 270 degrees C. and preferably between 180 and 250 degrees C. The crystallization time is between 0.5 and 20 hours and preferably between 2 and 10 hours. The thus obtained crystal is then filtered, washed and dried, and then calcined at a temperature of between 400 and 600 degrees C. and preferably between 450 and 550 degrees C. for a period of time ranging from 0.5 to 5 hours and preferably 2 to 3 hours. The catalysts produced have been designated ZKU-5, ZKU-6, and ZKU-7.

The zeolite synthesis reaction mixture is represented by the following composition in the form of mole ratios of oxide:

| | | |
|---|---|---|
| $SiO_2/Al_2O_3$ | 8–70 | [I] |
| $OH^-/SiO_2$ | 0.2–1.6 | |
| $H_2O/SiO_2$ | 10–30 | |
| $M/SiO_2$ | 0.2–1.7 | |
| $R/SiO_2$ | 0.0086–0.20 | |
| $R/M + R$ | 0.0005–0.40 | |
| $K_2O/M_2O$ | 0.05–0.3 | | wherein R represents a tetraloweralkyl ammonium cation; the alkyl groups selected from the groups consisting of methyl, ethyl and combinations thereof, and wherein M is a potassium or sodium cation.

A preferred composition [V] which includes a crystallization conditioning agent is as follows:

| | | |
|---|---|---|
| $SiO_2/Al_2O$ | 10–25 | [II] |
| $OH^-/SiO_2$ | 0.5–1.3 | |
| $H_2O/SiO_2$ | 15–26 | |
| $M/SiO_2$ | 0.55–1.4 | |
| $R/SiO_2$ | 0.0096–0.16 | |
| $R/M + R$ | 0.0060–0.22 | |
| $K_2O/M_2O$ | 0.07–0.20 | | wherein R and M are defined above.

Another preferred composition including a crystallization conditioning agent is as follows:

| | | |
|---|---|---|
| $SiO_2/Al_2O_3$ | 15–23 | [III] |
| $OH^-/SiO_2$ | 0.54–0.96 | |
| $H_2O/SiO_2$ | 16–20 | |
| $M/SiO_2$ | 0.60–1.1 | |
| $R/SiO_2$ | 0.013–0.015 | |
| $R/M + R$ | 0.014–0.032 | |
| $K_2O/M_2O$ | 0.12–0.17 | | wherein R and M are defined above.

A fourth composition including a crystallization conditioning agent is as follows:

| | | |
|---|---|---|
| $SiO_2/Al_2O_3$ | 13–23 | [IV] |
| $OH^-/SiO_2$ | 1.0–0.5 | |
| $H_2O/SiO_2$ | 10–20 | |
| $M/SiO_2$ | 0.5–1.5 | |
| $R/SiO_2$ | 0.009–0.015 | |
| $R/M + R$ | 0.0005–0.01 | |
| $K_2O/M_2O$ | 0.1–0.2 | | wherein R and M are defined above.

The crystal seed of the invention is made from various powders such as γ-alumina, kaolin and γ-alumina powders which are calcined at a temperature of 500 degrees C.

The crystal seed has a particle size between 0.05 and 10 micron and preferably 0.1 to 5 microns. If the particle sizes of the crystal seeds are outside of the above ranges, the effects of adding them to the zeolite mixture are unpredictable. The amount of crystal seed used in the zeolite composition is between 0.45 and 20 weight percent and preferably between 2 and 15 weight percent. These ranges are for the total amount of seed.

The metal and metal oxides which are supported by the crystal aluminosilicate zeolite catalyst are those in group eight of the periodic table and the rare earth elements.

Specifically, the metals and/or metal oxides are (a) one or more elements selected from Group eight of the periodic table of elements such as Ru, Rh, Pt, Pd, Ni, Co and Fe; (b) one or more oxides thereof; (c) a mixture of one or more metals belonging to the Group eight of the periodic table and the oxides of the rare earth metals and (d) a mixture of one or more oxides of said metals and one or more oxides of the rare earth metals.

The amount of metal and/or metal oxides supported on the crystal seed is between 0.5 and 12 weight percent and preferably between 2 and 8 weight percent.

The substance supporting the metal and/or metal oxide (crystal seed) is added to the zeolite synthetic reaction mixture having compositions in an amount between 0.45 and 20 weight percent and preferably between 2 and 15 weight percent as above.

Examples of catalysts manufactured according to the present invention include $Ni-La_2O_3$ catalyst (weight ratio of $Ni:La_2O_3 = 5:2.7$), $Ni-Ce_2O_3$ catalyst; $Ni-La_2O_3-Ru$ catalyst (weight ratio $Ni:La_2O_3:Ru = 5:2.7:0.7$) and $Ni-Ce_2O_3-Ru$ catalyst.

The specific character of the catalyst particle in cross section can be seen with reference to the figures.

Figure 2:
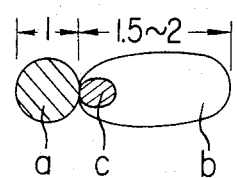

In FIGS. 1 and 2, the zeolite crystal (b) has a shape similar to that of rice and is positioned side by side around a crystal seed (a) of α-alumina. Crystal seed (c) of γ-alumina is positioned as shown and appears similar to a germ of a grain of rice. It contacts both the α-alumina (a) and the zeolite crystal (b). The length of the zeolite crystal in the longitudinal direction is 1.5 to 2.0 times the diameter of the α-alumina (a). The metal and/or metal oxides components are supported on the α-alumina (a) and/or the γ-alumina (c). The γ-alumina promotes the absorption velocity of the reactive gas, thereby accelerating the catalytic activity. The α-alumina in itself displays the shape factor of the catalytic reaction selectivity. The combination of the α-alumina (a) and the zeolite crystal (b) are not a mere physical mixture, but rather form a compact combination. Therefore, a plurality of functional catalytic actions are displayed. The α-alumina, positioned as shown in the center of the catalyst, is also characterized as a "skeleton" and a dispersant. It is especially useful as a skeleton for a molded catalyst, improving the mechanical strength and the dimensional stability thereof.

The metal and/or metal oxide components supported on the catalyst accelerate the absorption of the reactive molecules and improve the catalytic activity. They also promote contact-burning, due to their strong affinity for oxygen atoms. This characteristic of the metal and/or metal oxide components can be used effectively to burn out carbonaceous substances wich accumulate during the catalytic reaction and thereafter hinder further activity. Because of the affinity for oxygen, the burning of the accumulated substances can be carried out at the same temperature as that of the conversion of methanol.

to gas chromatographic methods. Test results are indicated in Table 1.

TABLE 1
COMPARISON OF CATALYTIC SELECTIVITY (STY) BETWEEN ZKU-CATALYSTS AND ZSM-34 CATALYST

| CATALYST | $C_1$ | $C_2=$ | $C_3$ | $C_3=$ | $C_4$ | $C_4=$ | $C_5<$ | $\Sigma C_2= \sim C_4=$ | $\Sigma HC(mol/l)$ |
|---|---|---|---|---|---|---|---|---|---|
| ZSM-34 | 21.3 | 32.5 | 9.9 | 20.9 | 4.9 | 11.0 | 0 | 64.4 | 6.16 |
| ZKU-5 | 7.1 | 25.8 | 1.1 | 33.1 | 1.0 | 23.4 | 8.6 | 82.3 | 10.97 |
| ZKU-6 | 10.0 | 24.4 | 2.4 | 34.5 | 2.5 | 19.7 | 6.5 | 78.6 | 13.79 |
| ZKU-7 | 13.0 | 30.9 | 1.9 | 30.7 | 1.7 | 16.6 | 5.3 | 78.2 | 19.84 |
| COMPARATIVE EXAMPLE (PHYSICAL MIXING METHOD) | 9.9 | 29.9 | 2.3 | 30.1 | 2.0 | 17.7 | 5.5 | 80.3 | 14.13 |

Thus, a catalyst regeneration can be effected without raising the temperature of the catalytic bed.

The method for supporting the metal and/or metal oxide in the catalyst as provided by the instant invention is an improvement over the prior art methods. In the manufacture of olefin from methanol, both the catalytic activity capable of forming the olefin and the catalytic life can be remarkably improved when the catalyst is manufactured using the method of the present invention. The synthesis of ethylene from methanol, one of the most useful reactions, can be improved using catalysts made by this invention. In general, the synthetic zeolite catalyst is useful for the direct synthetic reaction of olefins or liquid hydrocarbons from synthetic gas. The catalysts are also effective in applications involving various conversion reactions such as cracking, hydrocracking, alkylation, isomerization of paraffinic and naphthenic hydrocarbons, polymerizations of unsaturated compounds having double and triple bonds, reforming, isomerization of polyalkyl-substituted aromatic hydrocarbons, disproportionation and hydrogenation-dehydrogenation reactions.

A highly preferred use for the catalysts is for the manufacture of low molecular weight olefins such as ethylene and propylene from methanol and/or dimethylether. These reactions may be carried out with high selectivity using the catalyst.

EXAMPLE

A mixture consisting of one part by weight of $\gamma$-alumina having a particle size of 0.2 microns and three parts by weight of $\alpha$-alumina having a particle size of 1.5 to 2.5 microns was impregnated with an aqueous solution of nitrate or chloride of a metal component as described hereinabove.

The mixture obtained was evaporated on a water bath and then thermally decomposed. The decomposed mixture was then raised to a temperature of 400 degrees C. for 2 hours in the oven under the steam of hydrogen, and maintained at a temperature of 400 degrees C., for 0.5 hours. The mixture was then cooled under nitrogen gas.

A selective synthesis reaction for manufacturing low molecular weight olefin from methanol was carried out in the presence of crystalline aluminosilicate zeolite catalyst manufactured by adding $\alpha$-alumina and $\gamma$-alumina supporting metal and/or metal oxide in the course of crystallization of zeolite.

The space time velocity was 940 hr$^{-1}$ and the temperature was 400 degrees C. The feed gas to the reaction was 12% by volume methanol and 88% by volume nitrogen gas. The product gas was analyzed according In Table 1, symbols indicate the following: $C_1$: methane, $C_2=$ ethylene, $C_3$: propane, $C_3=$ propylene, $C_4$: butane, $C_4=$ butene, $C_5$; $C_5$-hydrogen. STY (mol/l.hr): space time yield, $\Sigma HC$ means the integrated amount (mol/l) of the total hydrocarbons formed during the period from the beginning of reaction to the formation of dimethylether (DME).

$\Sigma HC$ is the measure of indicating the catalytic life. It has the meaning that the more the value shown by the symbol "$\Sigma HC$" becomes large, the more the catalytic life become long.

In Table 1, the ZKU-5, ZKU-6, ZKU-7 catalyst were used.

The ZKU-5 catalyst was manufactured using crystal seed which constituted the crystal nucleus according to the method of Japanese patent application No. 136,715/80, now Japanese Patent laid open No. 63,135/82 which is hereby incorporated by reference.

The ZKU-6 catalyst was manufactured using crystal seed supporting five weight percent of Rh metal. The amount of Rh metal was 0.4 weight percent based on the total weight of the catalyst.

The ZKU-7 catalyst was manufactured using crystal seed supporting five weight percent of Ru metal. The amount of Ru metal was 0.4 weight percent based on the total weight of the catalyst. The catalyst used in the comparative example was a composite catalyst manufactured by physically mixing a ZKU-5 catalyst with $\alpha$-alumina and $\gamma$-alumina supporting the metal component of Ru respectively.

The ZSM-34 catalyst was manufactured according to the method of Japanese patent laid-open No. 58,499/78, hereby incorporated of reference.

From Table 1, it can be seen that the catalyst life of the catalyst manufactured according to the method of the present invention was about 1.5 times that of the comparative catalyst manufactured according to the physical mixing method.

It was also found that the ZKU-6, supporting Rh metal was superior in terms of catalytic life to the comparative catalyst supporting Ru metal manufactured by the physical mixing method, even taking into account the different metals utilized.

What is claimed is:

1. A process for producing a crystalline alumina-silicate zeolite comprising:
    preparing from 80 to 99.55 weight percent of a zeolite synthesis reaction mixture having a molar ratio of oxides as follows:

| | |
|---|---|
| $SiO_2/Al_2O_3$ | 8–70 |
| $OH^-/SiO_2$ | 0.2–1.6 |

|         |             |
|---------|-------------|
| H₂O/SiO₂ | 10–30 |
| M/SiO₂   | 0.2–1.7 |
| R/SiO₂   | 0.0086–0.20 |
| R/M + R  | 0.0005–0.40 |
| K₂O/M₂O  | 0.05–0.3 | wherein R represents a tetra alkyl ammonium cation, the alkyl radical being selected from the group consisting of methyl, ethyl and combination thereof and M is potassium or sodium cation; mixing from 0.45 to 20 weight percent of a crystal seed having a particle size between 0.05 and 10 microns, selected from the group consisting of α-alumina, kaolin and γalumina with said zeolite synthesis reaction mixture;

heating said mixture to a temperature of from 150 to 270 degrees C.;

maintaining said mixture at said temperature for a period of from 0.5 to 20 hours to form crystals;

further processing the obtained crystals by filtering, washing and drying; and calcining said crystals at a temperature of from 400 to 600 degrees C. for a period of from 0.5 to 5 hours;

wherein 0.5 to 12 weight percent of one or not less than two metals and/or metal oxides are deposited on said crystal seed on the weight basis of said crystal seed; and said metal and/or metal oxide are selected from the group consisting of Group 8 elements, rare earth elements, oxides of Group 8 elements, oxides of rare earth elements and combinations thereof.

* * * * *